US008908882B2

(12) United States Patent
Goodwin et al.

(10) Patent No.: US 8,908,882 B2
(45) Date of Patent: Dec. 9, 2014

(54) REPARATION OF CORRUPTED AUDIO SIGNALS

(75) Inventors: Michael M. Goodwin, Scotts Valley, CA (US); Carlo Murgia, Sunnyvale, CA (US)

(73) Assignee: Audience, Inc., Mountain View, CA (US)

( * ) Notice: Subject to any disclaimer, the term of this patent is extended or adjusted under 35 U.S.C. 154(b) by 1122 days.

(21) Appl. No.: 12/493,927

(22) Filed: Jun. 29, 2009

(65) Prior Publication Data

US 2011/0142257 A1 Jun. 16, 2011

(51) Int. Cl.
*H04B 15/00* (2006.01)
*G06F 17/00* (2006.01)
*G10L 19/005* (2013.01)

(52) U.S. Cl.
CPC .................................... *G10L 19/005* (2013.01)
USPC ............................ 381/94.4; 700/94; 381/94.3

(58) Field of Classification Search
USPC .................. 381/71.14, 94.2, 94.3, 94.4, 94.8; 700/94
See application file for complete search history.

(56) References Cited

U.S. PATENT DOCUMENTS

| | | | | |
|---|---|---|---|---|
| 2004/0083110 | A1* | 4/2004 | Wang | 704/500 |
| 2005/0043959 | A1 | 2/2005 | Stemerdink et al. | |
| 2006/0242071 | A1 | 10/2006 | Stebbings | |
| 2007/0033494 | A1 | 2/2007 | Wenger et al. | |
| 2007/0198254 | A1* | 8/2007 | Goto et al. | 704/226 |
| 2008/0117901 | A1 | 5/2008 | Klammer | |
| 2008/0118082 | A1* | 5/2008 | Seltzer et al. | 381/94.1 |
| 2008/0212795 | A1* | 9/2008 | Goodwin et al. | 381/94.2 |

OTHER PUBLICATIONS

Lu, Lie, et al. "A Robust Audio Classification and Segmentation Method", 2001, Microsoft Research, pp. 203, 206, and 207.*
International Search Report and Written Opinion dated Aug. 19, 2010 in Application No. PCT/US10/01786.

* cited by examiner

*Primary Examiner* — Jesse Elbin
(74) *Attorney, Agent, or Firm* — Carr & Ferrell LLP

(57) ABSTRACT

Corrupted portions of an audio signal are detected and repaired. An audio signal, including numerous sequential frames, may be received from an audio input device. One or more corrupted frames included in the audio signal may be identified. A frame approximating an uncorrupted frame and corresponding to each corrupted frame may be constructed. Each corrupted frame may be replaced with a corresponding constructed frame to generate a repaired audio signal. The repaired audio signal may be outputted via an audio output device.

21 Claims, 8 Drawing Sheets

REPARATION OF CORRUPTED AUDIO SIGNALS

BACKGROUND OF THE INVENTION

1. Field of the Invention

The present invention relates generally to audio processing. More specifically, the present invention relates to repairing corrupted audio signals.

2. Related Art

Audio signals can comprise a series of frames or other transmission units. An audio signal can become corrupted when one or more frames included in that audio signal are damaged. Frames can be damaged as a result of various events that are often localized in time and/or frequency. Examples of such events include non-stationary noises (e.g., impact noises, keyboard clicks, door slams, etc.), packet losses in a communication network carrying the audio signal, noise burst leakage caused by inaccurate noise or echo filtering, and over-suppression of desired signal components such as a speech component. These events may be generally referred to as 'dropouts' since a desired signal component is lost or severely damaged in one or more frames of a given audio signal.

In many applications such as telecommunications, corruption in an audio signal can be an annoyance or a distraction, or, worse yet, a drastic impairment of critical communication. Even in systems with noise suppression capabilities, damaged frames can be audible in a processed signal by a user since such noise suppressors are typically too slow to track highly non-stationary noise events such as dropouts. Therefore, there is a need to repair audio signals that are corrupted by damaged frames.

SUMMARY OF THE INVENTION

Embodiments of the present technology allow corrupted audio signals to be repaired.

In a first claimed embodiment, a method for repairing corrupted audio signals is disclosed. The method includes receiving an audio signal from an audio input device. The audio signal includes a plurality of sequential frames. A corrupted frame in the plurality of sequential frames is then identified. A frame that corresponds to the corrupted frame is constructed. The constructed frame approximates an uncorrupted frame. The corrupted frame is replaced by the corresponding constructed frame to generate a repaired audio signal. The repaired audio signal is outputted via an audio output device.

In a second claimed embodiment, a system is set forth. The system includes a detection module, a construction module, a reparation module, and a communications module. These modules may be stored in memory and executed by a processor to effectuate the functionality attributed thereto. The detection module may be executed to identify one or more corrupted frames included in a received audio signal. The construction module may be executed to construct a frame that corresponds to each of the one or more corrupted frames. Each constructed frame may approximate an uncorrupted frame. The reparation module may be executed to replace each of the one or more corrupted frames with a corresponding constructed frame to generate a repaired audio signal. The communications module may be executed to output the repaired audio signal via an audio output device.

A third claimed embodiment sets forth a computer-readable storage medium having a program embodied thereon. The program is executable by a processor to perform a method for repairing corrupted audio signals. The program may be executed to enable the processor to receive an audio signal from an audio input device. The audio signal may include a plurality of sequential frames. One or more corrupted frames may be identified in the audio signal. The one or more corrupted frames may be consecutive. A frame that corresponds to each of the one or more corrupted frames may be constructed. Each constructed frame approximates an uncorrupted frame. By execution of the program, the processor can replace each of the one or more corrupted frames with a corresponding constructed frame to generate a repaired audio signal and output the repaired audio signal via an audio output device.

DETAILED DESCRIPTION OF EXEMPLARY EMBODIMENTS

The present technology repairs corrupted audio signals. Damaged regions of an audio signal (e.g., one or more consecutive frames) can be detected. Once the damaged regions are detected, information can be determined from non-corrupted regions adjacent to the damaged regions. The determined information can be used to resynthesize the damaged region as a newly constructed frame or portion thereof, thus repairing the audio signal.

Figure 1:
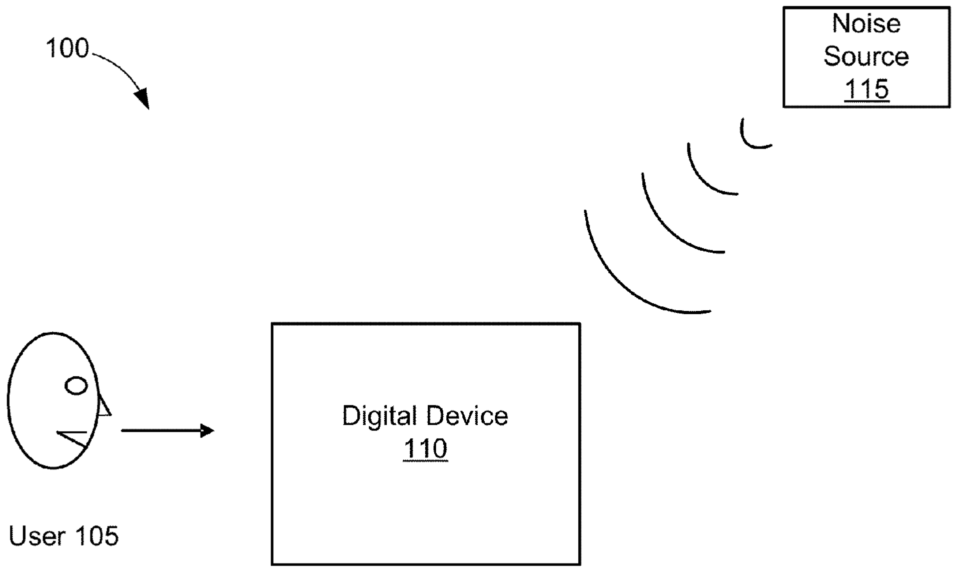
FIG. 1 is a block diagram of an exemplary environment for practicing embodiments of the present technology.

Referring now to FIG. 1, a block diagram of an exemplary environment 100 for practicing embodiments of the present technology is shown. As depicted, the environment 100 includes a user 105, a digital device 110, and a noise source 115. The user 105 or some other audio source may provide an audio signal to the digital device 110. Additionally, the audio signal may be provided to the digital device 110 by another digital device in communication with the digital device 110 via a communications network (not shown). For example, the digital device 110 may comprise a telephone that can receive an audio signal from the user 105 or another telephone. The digital device 110 is described in further detail in connection with FIG. 2.

The noise source 115 introduces noise that may be received by the digital device 110. This noise may corrupt the audio signal provided by the user 105 or some other audio source. Although the noise source 115 is shown coming from a single location in FIG. 1, the noise source 115 may comprise any sounds from one or more locations, and may include reverberations and echoes. The noise source 115 may be stationary, non-stationary, or a combination of both stationary and non-stationary noise. It is noteworthy that audio signals may be corrupted by other causes besides the noise source 115. For instance, an audio signal can become corrupted during transmission through a network or during processing such as by packet loss or other signal loss mechanisms in which information contained in the audio signal is lost.

Figure 2:
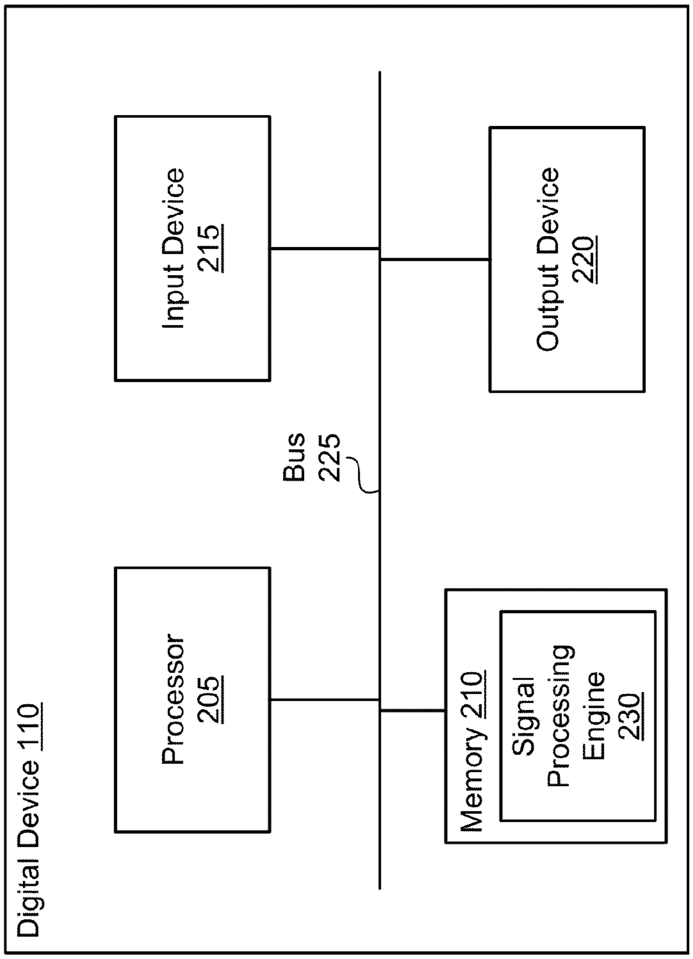
FIG. 2 is a block diagram of an exemplary digital device.

FIG. 2 is a block diagram of the exemplary digital device 110. The digital device 110, as depicted, includes a processor 205, a memory 210, an input device 215, an output device 220, and a bus 225 that facilitates communication therebetween. Other various components (not shown) that are not necessary for describing the present technology may also be included in the digital device 110, in accordance with exemplary embodiments. As depicted, the memory 210 includes a signal processing engine 230, which is discussed in further detail in connection with FIG. 3. According to various embodiments, the digital device 110 may include any device that receives and optionally sends audio information or signals, such as telephones (e.g., cellular phones, smart phones, conference phones, and land-line phones), telecommunication accessories (e.g., hands-free headsets and ear buds), handheld transceivers (e.g., walkie talkies), audio recording systems, etc.

The processor 205 may execute instructions and/or a program to effectuate the functionality described thereby or associated therewith. Such instructions may be stored in memory 210. The processor 205 may include a microcontroller, a microprocessor, or a central processing unit. In some embodiments, the processor can include some amount of on-chip ROM and/or RAM. Such on-chip ROM and RAM can include the memory 210.

The memory 210 includes a computer-readable storage medium. Common forms of computer-readable storage media include, for example, a floppy disk, a flexible disk, a hard disk, magnetic tape, any other magnetic medium, a CD-ROM disk, digital video disk (DVD), and non-volatile memory such as NAND flash and NOR flash. Furthermore, the memory 210 may comprise other memory technologies as they become available.

The input device 215 can include any device capable of receiving an audio signal. In exemplary embodiments, the input device 215 includes a microphone or other electroacoustic device that can convert audible sound from the environment 100 to an audio signal. The input device 215 may also include a transmission receiver that receives audio signals from other devices over a communication network. Such a communication network may include a wireless network, a wired network, or any combination thereof.

The output device 220 may include any device capable of outputting an audio signal. For example, the output device 220 can comprise a speaker or other electroacoustic device that can render an audio signal audible in the environment 100. Additionally, the output device 220 can include a transmitter that can send an audio signal to other devices over a communication network.

Figure 3:
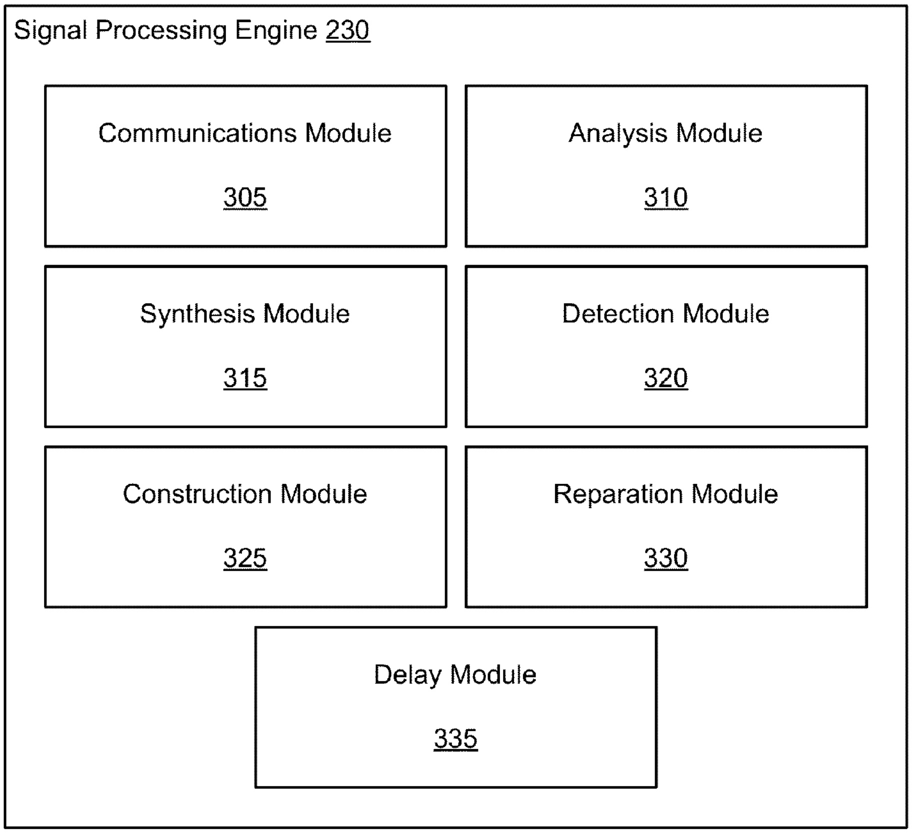
FIG. 3 is a block diagram of an exemplary signal processing engine.

FIG. 3 is a block diagram of an exemplary signal processing engine 230. As depicted, the signal processing engine 230 includes a communications module 305, an analysis module 310, a synthesis module 315, a detection module 320, a construction module 325, a reparation module 330, and a delay module 335. As mentioned in connection with FIG. 2, the signal processing engine 230 and its constituent modules may be stored in the memory 210 and executed by the processor 205 to effectuate the functionality corresponding thereto. The signal processing engine 230 can be composed of more or fewer modules (or combinations of the same) and still fall within the scope of the present technology. For example, the functionality of the construction module 325 and the functionality of the reparation module 330 may be combined into a single module.

Execution of the communications module 305 facilitates communication between the processor 205 and both the input device 215 and the output device 220. For example, the communications module 305 can be executed to receive an audio signal at the processor 205 from the input device 215. Likewise, the communications module 305 may be executed to send an audio signal from the processor 205 to the output device 220.

In exemplary embodiments, a received audio signal is decomposed into frequency subbands, which represent different frequency components of the audio signal. The frequency subbands are processed and then reconstructed into a processed audio signal to be outputted. Execution of the analysis module 310 allows the processor 205 to decompose an audio signal into frequency subbands. The synthesis module 315 can be executed to reconstruct an audio signal from a decomposed audio signal.

Both the analysis module 310 and the synthesis module 315 may include filters or filter banks, in accordance with various embodiments. Such filters may be complex-valued filters. These filters may be first order filters (e.g., single pole, complex-valued) to reduce computational expense as compared to second and higher order filters. Additionally, the filters may be infinite impulse response (IIR) filters with cutoff frequencies designed to produce a desired channel resolution. In some embodiments, the filters may be designed to be frequency-selective so as to suppress or output signals within specific frequency bands. In some embodiments, the filters may perform transforms with a variety of coefficients (e.g., Hilbert transforms) upon a complex audio signal in order to suppress or output signals within specific frequency subbands. In other embodiments, the filters may perform fast cochlear transforms to simulate an auditory response of a human ear. The filters may be organized into a filter cascade whereby an output of one filter becomes an input in a next filter in the cascade. Sets of filters in the cascade may be separated into octaves. Collectively, the outputs of the filters may represent frequency subbands or components of an audio signal.

Execution of the detection module 320 allows damage or corruption in frames of an audio signal to be identified. Such damage or corruption may be present in one or more subbands of the frames. An example of a damaged frame is discussed in connection with FIG. 4. According to exemplary embodiments, the damaged or corrupted frames can be identified by comparing a subject frame with one or more frames proximal to that subject frame. A subject frame is a frame that is currently being analyzed to determine if it is damaged or corrupted.

One comparison that may be used to identify damaged or corrupted frames involves determining spectral flux. Spectral flux is a measure of how quickly the magnitude spectrum or the power spectrum of a signal is changing. Spectral flux, for example, can be calculated by comparing the magnitude spectrum for a subject frame against the magnitude spectrum from a previous frame and/or a succeeding frame. According to one example, spectral flux φ[n] of an audio signal (for frame n) may be written as $$\phi[n] = \sum_f a_f |x_n[f] - x_{n-1}[f]|^2, \tag{1}$$

where $x_n$[f] is the magnitude spectrum of a subject frame n in frequency subband f, $x_{n+1}$[f] is the magnitude spectrum of the frame n−1 that precedes the subject frame n in frequency subband f, $a_f$ is a scaling coefficient that may vary by frequency subband, and z is an exponent. The scaling coefficient $a_f$ may weight certain frequencies (e.g., high frequencies) differently, for example, when those certain frequencies are more indicative of non-stationary noise. In exemplary embodiments, the exponent z=2. Additionally, in some embodiments, only terms of the above summation that satisfy the constraint $x_n[f]<x_{n+1}[f]$ (i.e., the magnitude spectrum is increasing) are utilized in calculating spectral flux $\phi[n]$.

Due to normal inflection in speech, spectral flux alone may not be sufficient to identify corrupted or damaged frames in an audio signal. For example, a rising vowel sound may result in a large spectral flux between adjacent frames even though neither of the adjacent frames is corrupted. To complement spectral flux as a metric to identify damaged frames, a correlation coefficient may be determined between a subject frame and a previous frame and/or succeeding frame. In one example, a correlation coefficient $\rho[n]$ between a subject frame n and a preceding frame n−1 can be written as $$\rho[n]=\frac{\sum_f (x_n[f]-\overline{x_n[f]})(x_{n-1}[f]-\overline{x_{n-1}[f]})}{\sqrt{\sum_f (x_n[f]-\overline{x_n[f]})^2\sum_f (x_{n-1}[f]-\overline{x_{n-1}[f]})^2}}, \tag{2}$$

where $\overline{x_n[f]}$ and $\overline{x_{n-1}[f]}$ correspond to the average or mean of the magnitude spectra $x_n[f]$ and $x_{n-1}[f]$, respectively. As such, if the gain between frame n and frame n−1 is different, but the respective spectral shapes are the same, the correlation coefficient between frames n and n−1 will be unity. Furthermore, in exemplary embodiments, a value such as $\phi[n]/\rho[n]$ may be used to identify damaged or corrupted frames. Such a value may be required to exceed a threshold to indicate a damaged frame.

It is noteworthy that in some embodiments, an indication of a corrupted frame can be provided to the detection module 320. Such an indication may be received, for example, from another digital device in communication with the digital device 110. An indication of a corrupted frame can identify a lost, erased, or damaged packet or frame. When an indication of a corrupted frame is provided, signal processing otherwise performed through execution of the detection module 320 to detect corrupted frames may be bypassed.

The construction module 325 can be executed to allow frames to be constructed or construed that correspond to each corrupted or damaged frame identified by the detection module 320. Generally speaking, a frame corresponding to a corrupted or damaged frame can be constructed to approximate an undamaged frame that includes an original audio signal, as it was prior to any signal corruption. A constructed frame may be based on one or more frames proximal to a corresponding damaged frame. For example, a constructed frame may include an audio signal that is an extrapolation from at least one frame preceding the corrupted frame. In another example, the constructed frame may include a signal that is an interpolation between at least one frame preceding a corrupted frame and at least one frame succeeding that corrupted frame. According to exemplary embodiments, interpolation and extrapolation can be performed on a per subband basis. An example of a constructed frame is discussed in connection with FIG. 4.

Execution of the reparation module 330 allows corrupted frames to be replaced by corresponding constructed frames to generate a repaired audio signal. It is noteworthy that entire frames (i.e., across all frequency subbands) or individual subband frames can be identified as damaged. Accordingly, repairs to frames may be performed on entire frames, or on one or more individual subbands within a frame. For example, some or all subbands of a given frame may be replaced by information construed by the construction module 325. If a given subband of an otherwise corrupted frame contains an undamaged component of the signal, the given subband may not be replaced. Moreover, in some embodiments, a corrupted subband of a frame may be replaced by a corresponding constructed subband of that frame when the constructed subband is an underestimate of the corrupted subband. In addition, a corrupted subband of that same frame may not be replaced by a corresponding constructed subband of that frame when the constructed subband is an overestimate of the corrupted subband. A constructed frame may be averaged, or combined otherwise, with a corresponding corrupted frame. To reduce discontinuity between constructed frames and adjacent uncorrupted frames, cross-fading may be performed. In one embodiment, a 20 millisecond linear cross-fade is utilized. Such a cross-fade may include magnitude and phase.

According to some embodiments, delaying signals by one or more frames may be advantageous. Execution of the delay module 335 allows audio signals to be delayed during various processing steps of the signal processing engine 230. Examples of such delays are described further in connection with FIGS. 5B and 6.

Figure 4:
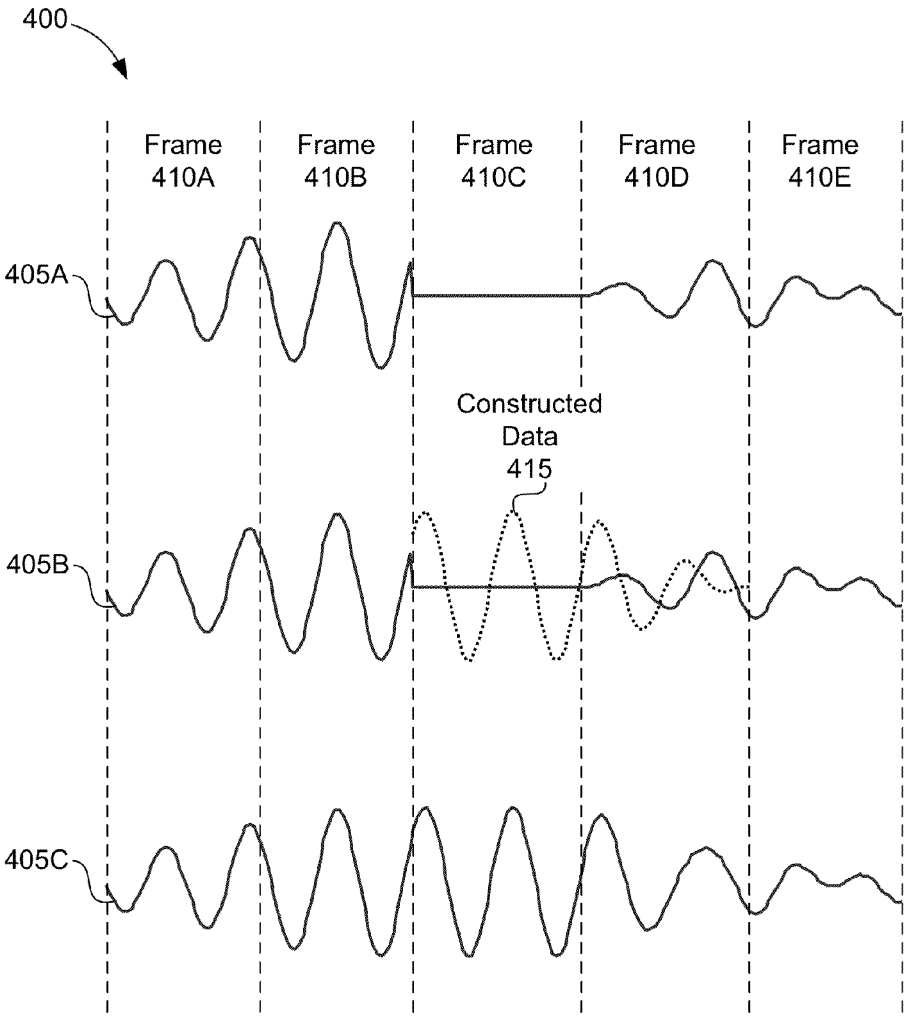
FIG. 4 illustrates exemplary reparation of a corrupted audio signal.

FIG. 4 illustrates exemplary reparation 400 of a corrupted audio signal. The audio signal is shown at various stages of reparation 405A-405C. The audio signal includes five frames 410A-410E. As depicted, frame 410C at stage 405A is corrupted. This may be identified by the detection module 320 since frame 410C at stage 405A has low correlation and high spectral flux with respect to the adjacent frames 410B and 410D. Constructed data 415 is shown overlain on frame 410C at stage 405B. The constructed data 415 is construed by the construction module 325 by extrapolating information from frame 410B. Alternatively, the constructed data 415 could be interpolated between frames 410B and 410D. At stage 405C, the constructed data 415 has replaced the frame 410C via execution of the reparation module 330 yielding a repaired audio signal. Note that the constructed data 415 has been cross-faded with frame 410D in stage 405C to reduce any discontinuity therebetween.

Figure 5A:
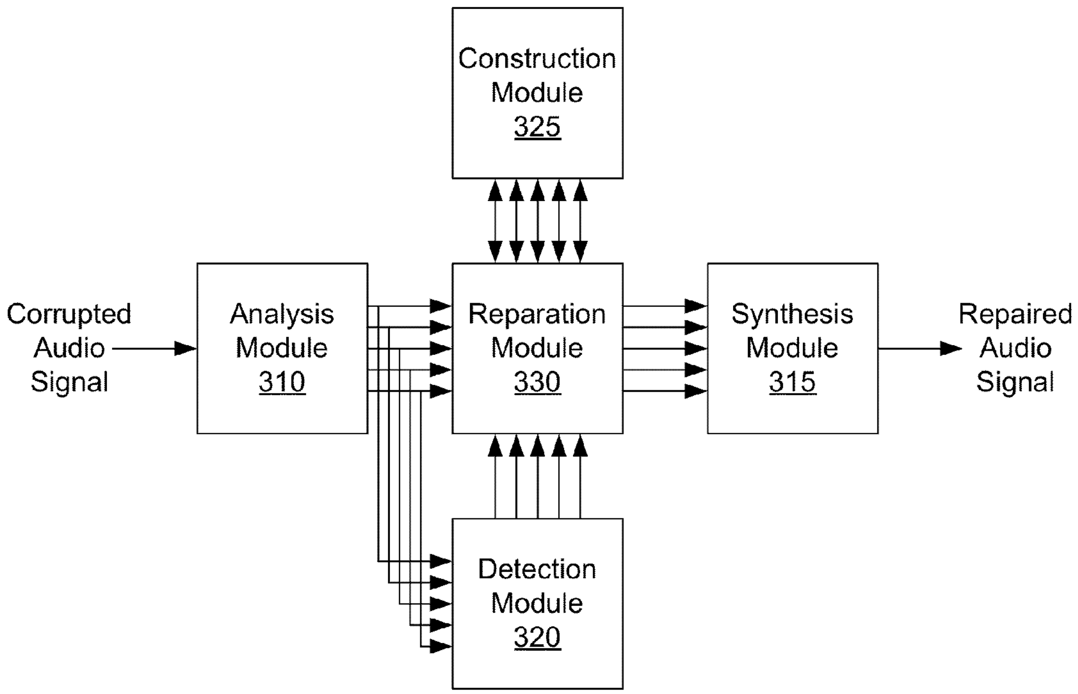
FIGS. 5A and 5B respectively illustrate different signal paths in the signal processing engine, according to exemplary embodiments.
Figure 5B:
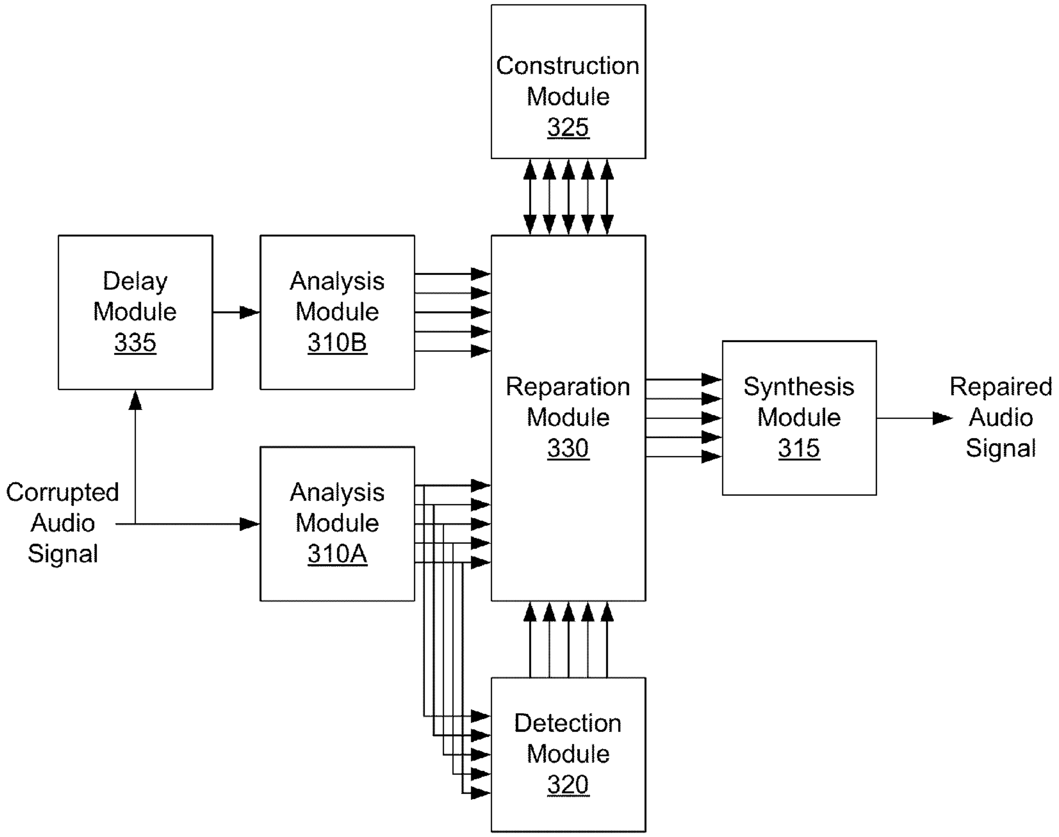

FIGS. 5A and 5B respectively illustrate inter-module signal paths in the signal processing engine 230, according to exemplary embodiments. In the embodiment depicted in FIG. 5A, a corrupted audio signal is received by the analysis module 310, which decomposes the corrupted audio signal into frequency subbands. The frequency subbands of the corrupted audio signal are then received by the reparation module 330 and the detection module 320. After the detection module 320 identifies one or more damaged frames in the audio signal, the construction module 325 generates or constructs corresponding frames and communicates the constructed frames to the reparation module 330 to replace the damaged frames in the received audio signal. In some embodiments, repaired frequency subbands are sent from the reparation module 330 to the synthesis module 315 to be reconstructed as a repaired audio signal. It is noteworthy that, in exemplary embodiments, frames may simply be passed through various modules of the signal processing engine 230 when no damage is detected.

In the embodiment depicted in FIG. 5B, a corrupted audio signal is received by an analysis module 310A and the delay module 335, which then forwards a delayed corrupted audio signal to an analysis module 310B. The analysis modules 310A and 310B can be implemented in a similar manner and operate in a like manner to analysis module 310 as described in connection with FIGS. 3 and 5A. The analysis modules 310A and 310B decompose the corrupted audio signal and the delayed corrupted audio signal into frequency subbands that are sent to the reparation module 330. The frequency subbands of the corrupted audio signal are also received by the detection module 320 to identify damaged frames. Based on any identified damaged frames and the delayed corrupted audio signals, frames may be construed and constructed by the construction module 325. The identified damaged frames are then replaced by corresponding constructed frames by the reparation module 330. Repaired frequency subbands are sent from the reparation module 330 to the synthesis module 315 to be reconstructed as a repaired audio signal.

Figure 6:
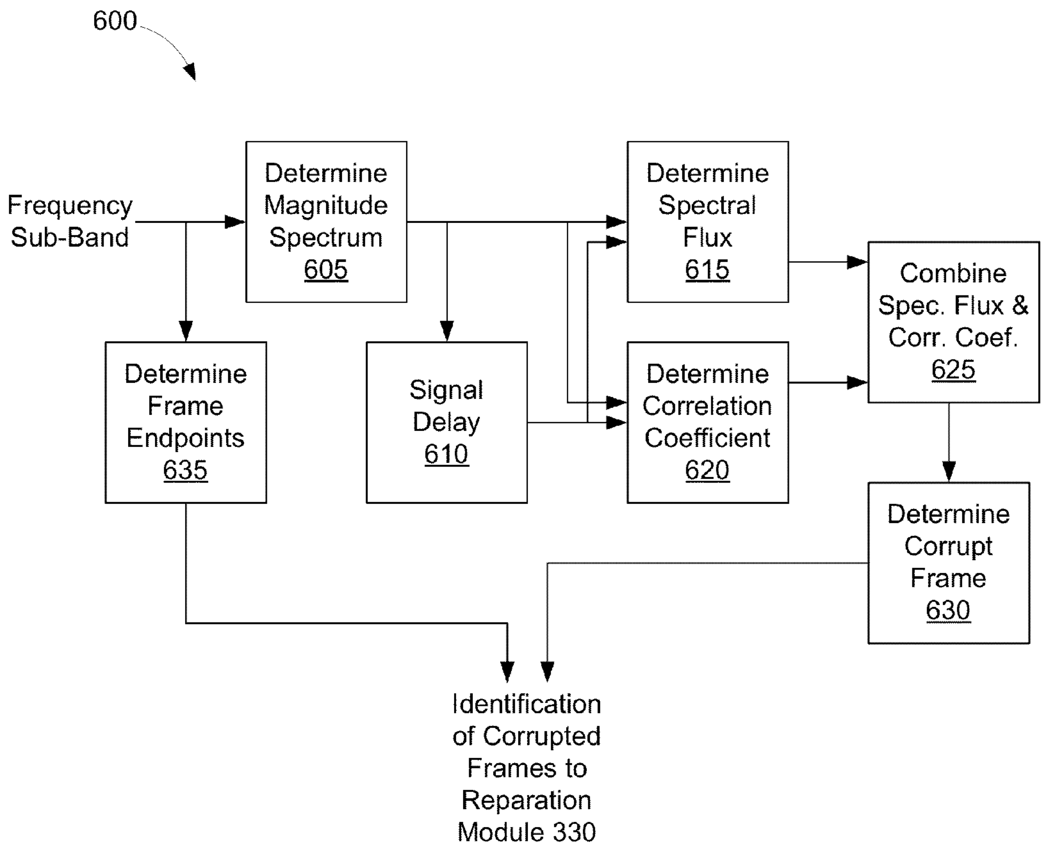
FIG. 6 illustrates an exemplary process flow of a detection module included in the signal processing engine.

FIG. 6 illustrates an exemplary process flow 600 performed by the detection module 320. Frequency subband data is received by the detection module 320 at flow points 605 and 635. As discussed herein, the frequency subband may be generated by the analysis module 310 through decomposition of an audio signal. At flow point 605, the magnitude spectrum of the frequency subband is determined. The magnitude spectrum is delayed at flow point 610 such that the magnitude spectrum and the delayed magnitude spectrum may be delivered to flow points 615 and 620. The delay module 335 may delay the magnitude spectrum in accordance with some embodiments. At flow point 615, spectral flux for a subject frame is determined based on the magnitude spectrum and the delayed magnitude spectrum. A correlation coefficient for the subject frame is determined based on the magnitude spectrum and the delayed magnitude spectrum at flow point 620. The spectral flux and the correlation coefficient are combined such as by a ratio therebetween at flow point 625. A determination is made at flow point 630 as to whether the subject frame is corrupt or not. Additionally, endpoints of the subject frame are determined at flow point 635. The corruption determination identifies the subject frame as a corrupt frame or as an uncorrupt frame. Identification information of corrupt frames and the frame endpoint information may be forwarded to the reparation module 330. Furthermore, the construction module 325 may use the endpoint information to generate the repaired signal frame.

Figure 7:
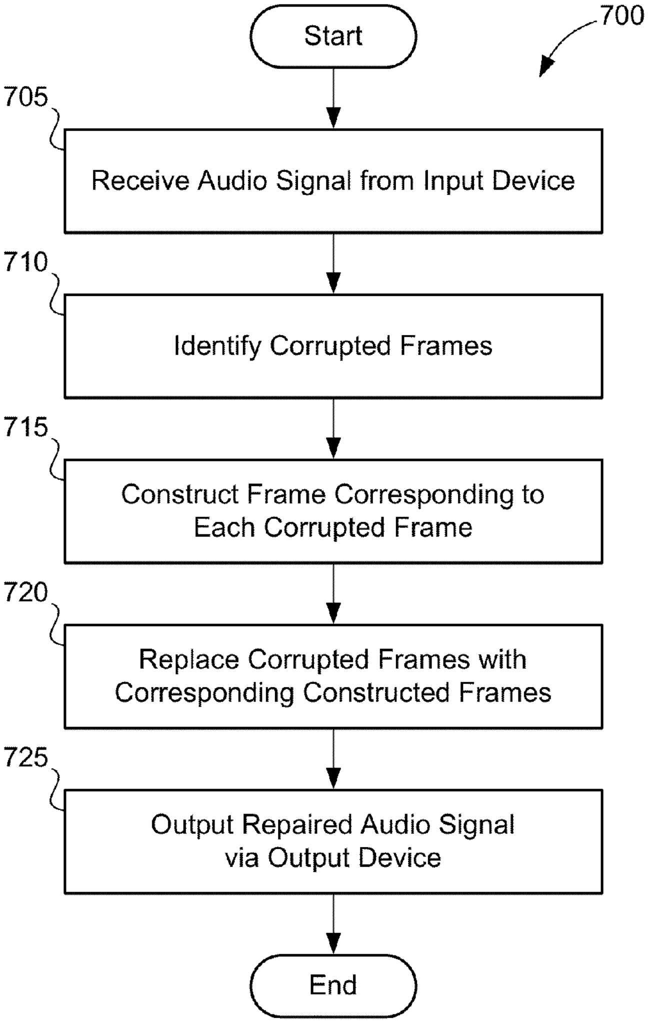
FIG. 7 is a flowchart of an exemplary method for repairing corrupted audio signals.

FIG. 7 is a flowchart of an exemplary method 700 for repairing corrupted audio signals. The steps of the method 700 may be performed in varying orders. Steps may be added or subtracted from the method 700 and still fall within the scope of the present technology.

In step 705, an audio signal is received from an audio input device, such as the input device 215. The audio signal may include numerous sequential frames. Additionally, the communications module 305 may be executed such that the processor 205 receives the audio signal from the input device 215.

In step 710, one or more corrupted frames included in the audio signal received in step 705 may be identified. These one or more corrupted frames may be consecutive. According to various embodiments, the one or more corrupted frames may be identified based on spectral flux and/or correlation between the one or more corrupted frames and proximal uncorrupted frames. Furthermore, the detection module 320 may be executed to perform step 710.

In step 715, a frame is constructed to correspond to each of the one or more corrupted frames. As discussed herein, each constructed frame approximates an uncorrupted frame. Step 715 is performed via execution of the construction module 325 in accordance with exemplary embodiments.

In step 720, each of the one or more corrupted frames is replaced with a corresponding constructed frame to generate a repaired audio signal. In exemplary embodiments, the reparation module 330 is executed to perform step 720.

In step 725, the repaired audio signal is outputted via an audio output device, such as the output device 220. The communications module 305 may be executed such that the repaired audio signal is sent from the processor 205 to the output device 220 according to exemplary embodiments.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for repairing corrupted audio signals, the method comprising:

receiving an audio signal, the audio signal comprising a plurality of sequential frames;

detecting corruption in a frame in the plurality of sequential frames, the detecting including forming a comparison between a subject frame and one or more frames proximal to the subject frame, the comparison based at least in part on a correlation between the subject frame and the one or more proximal frames;

identifying, using at least one processor, a corrupted frame in response to detecting corruption in the frame;

constructing a frame corresponding to the corrupted frame, the constructed frame approximating an uncorrupted frame; and replacing the corrupted frame with the corresponding constructed frame to generate a repaired audio signal.

2. The method of claim 1, further comprising decomposing the audio signal into frequency subbands.

3. The method of claim 1, wherein one or more corrupted frames are consecutive.

4. The method of claim 2, wherein detecting corruption in the frame is performed on a per subband basis.

5. The method of claim 1, wherein the comparison is based, at least partially, on spectral flux between the subject frame and the one or more proximal frames.

6. The method of claim 1, wherein the constructing is based, at least partially, on one or more frames proximal to the corrupted frame.

7. The method of claim 1, wherein the constructing comprises extrapolating from at least one frame preceding the corrupted frame.

8. The method of claim 1, wherein the constructing comprises interpolating between at least one frame preceding the corrupted frame and at least one frame succeeding the corrupted frame.

9. The method of claim 1, further comprising crossfading the constructed frame and an adjacent uncorrupted frame.

10. The method of claim 1, wherein detecting corruption in the frame comprises receiving an indication of the corrupted frame.

11. The method of claim 1, wherein the corrupted frame is a result of packet loss.

12. A system for repairing corrupted audio signals, the system comprising:

a detection module using a processor:

to detect corruption in one or more frames included in a received audio signal, the detecting including forming a comparison between a subject frame and one or more frames proximal to the subject frame, the comparison based at least in part on a correlation between the subject frame and the one or more proximal frames, and to identify one or more corrupted frames in response to detecting corruption in the one or more frames;

a construction module using a processor to construct one or more frames, each of the one or more constructed frames corresponding to a respective corrupted frame of the one or more corrupted frames, each constructed frame approximating an uncorrupted frame; and a reparation module using a processor to replace each of the one or more corrupted frames with a corresponding constructed frame to generate a repaired audio signal.

13. The system of claim 12, further comprising an analysis module using a processor to decompose the audio signal into frequency subbands.

14. The system of claim 12, further comprising a communications module using a processor to receive the audio signal.

15. The system of claim 12, wherein the comparison is further based, at least partially, on spectral flux between the subject frame and the one or more proximal frames.

16. The system of claim 12, wherein constructing the one or more frames by the construction module is based, at least partially, on one or more frames proximal to the one or more corrupted frames.

17. The system of claim 12, wherein constructing the one or more frames comprises extrapolation from at least one frame preceding the one or more corrupted frames.

18. The system of claim 12, wherein constructing the one or more frames comprises interpolation between at least one frame preceding the one or more corrupted frames and at least one frame succeeding the one or more corrupted frames.

19. The system of claim 12, wherein the reparation module is further crossfades a constructed frame and an adjacent uncorrupted frame.

20. A non-transitory computer-readable storage medium having a program embodied thereon, the program executable by a processor to perform a method for repairing corrupted audio signals, the method comprising:

receiving an audio signal, the audio signal comprising a plurality of sequential frames;

detecting corruption in one or more frames included in the audio signal, the detecting including forming a comparison between a subject frame and one or more frames proximal to the subject frame, the comparison based at least in part on a correlation between the subject frame and the one or more proximal frames;

identifying one or more corrupted frames in response to detecting corruption in the one or more frames;

constructing one or more frames, each of the one or more constructed frames corresponding to a respective corrupted frame of the one or more corrupted frames, each constructed frame approximating an uncorrupted frame; and replacing each of the one or more corrupted frames with a corresponding constructed frame to generate a repaired audio signal.

21. The non-transitory computer-readable storage medium of claim 20, wherein the constructed frame is constructed based at least in part on one or more frames proximal to the one or more corrupted frames.

* * * * *